May 15, 1928.
R. MIHATSCH
1,670,268
TUBE EXPANDER
Original Filed July 13, 1926
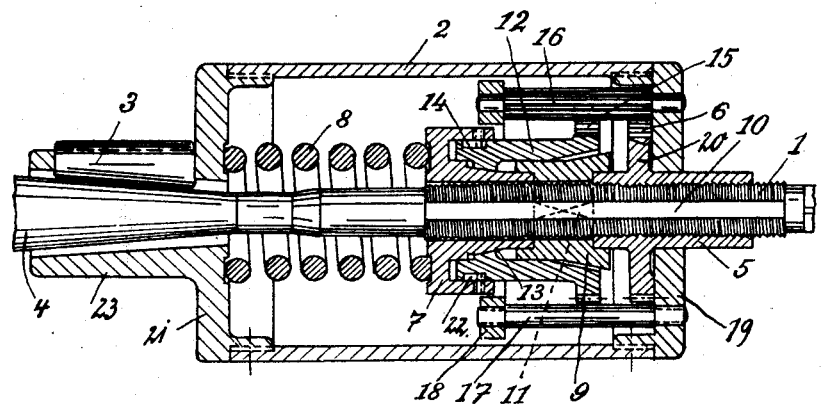
Inventor
Rudolf Mihatsch.
By William C. Linton.
Attorney.

Patented May 15, 1928.

1,670,268

UNITED STATES PATENT OFFICE.

RUDOLF MIHATSCH, OF BERLIN, GERMANY.

TUBE EXPANDER.

Application filed July 13, 1926, Serial No. 122,168, and in Germany July 13, 1925. Renewed March 14, 1928.

My invention relates to tube expanders or tools employed for inserting water-tubes into the walls of boilers or headers and more particularly for expanding the inserted end of the tube in order to ensure a tight fit. The invention more particularly pertains to a machine or tool of the stated kind having a plurality of expanding rolls which are simultaneously actuated by a conical roller adapted to be operated by means of a threaded spindle or the like, either manually or with the aid of a suitable motor.

Tools or machines of the kind, as hitherto constructed, comprise a casing, a conical roller or mandrel connected with a threaded spindle, suitably mounted in said casing, and a plurality of expanding rolls mounted so as to enclose the said roller and to be capable of radial displacement upon operation of the latter. A spring is provided for intercepting and absorbing and counter-pressure resulting from the action the rolls upon the walls of the tube end to be expanded.

Machines or tools of this known type are objectionable for the reason that, for the purpose of expanding the end of the tube inserted into the hole of the wall of the header or boiler, the spindle must be turned in one direction and for loosening the rolls subsequently in order to allow of the withdrawal of the tool the spindle must be turned in opposite direction which, in case of manual operation, will require much time and, in case of employing a motor or the like for carrying out such operation, will require a reversing mechanism and a great amount of power.

The object of my invention is to remedy this defect and with this object in view I construct and arrange the cooperating parts of the tool or machine in a manner that the radial displacement of the expanding rolls in both directions, that is for the expanding purpose and for the loosening or withdrawing purpose, will be brought about by revolving the spindle in one and the same direction only.

Accordingly the essence of my invention resides in the provision of a coupling cone on the spindle at a point intermediate between the nut of the threaded spindle and the abutting disk or cap for the counterspring, the said coupling cone being mounted and adapted to slide in or along a longitudinal groove of the spindle and to revolve simultaneously with the spindle and to cooperate with a hollow or female cone, the arrangement being such that the said coupling cone, as soon as the rolls impart to the tube a pressure sufficient to expand the latter to ensure a tight fit, as desired or required, will be forced into the said second or female cone through the action of the spindle nut advancing into the casing partaking of the revolving movement. The female or counter-cone in turn is mounted and adapted to receive from the coupling cone when the expansion of the tube has been finished and the rolls have automatically discontinued to work, as the revolving speed of the roller spindle increases, and to act to impart motion, by means of a toothed rim provided on the counter-cone for the purpose, to a toothed or fluted shaft journalled in suitable bearings in parallel relationship in respect to the spindle, the toothed shaft engaging in turn with a toothed rim provided on the nut so that the latter will be turned thereby in opposite direction, that is, the releasing direction for returning the roller spindle to its initial position or readiness for a next expanding operation.

With the above recited object in view and having thus set forth in general the principle upon which my invention depends, reference is had to the following specification and drawing in which there is exhibited one example or embodiment of the invention which, however, is in no way intended as a limitation upon the scope of the appended claims as it is to be clearly undertsood that variations and modifications, which fairly fall within the true scope of said claims may be resorted to when found expedient.

Referring to the drawing forming a part of this specification and showing a longitudinal section of the structure embodying my invention, 1 designates the threaded spindle, 2 is the casing enclosing the spindle and other parts of the tool and 3 denotes one of preferably three hard steel rolls suitably mounted as usually in the front-end cover 21 of the casing so as to be radially displaceable therein to laterally project more or less from the tubular extension 23 of the cover. The rolls 3 are of conical shape and adapted to be displaced laterally in outward direction by the conical roller 4 integral with the spindle 1, when the latter is moved to draw the roller in, as will be readily understood on inspection of the drawing.

The outer end of the spindle is shaped to form a square body for the application of a key or for connection with a motor or the like. The spindle engages in a nut 5 mounted in the rear cover 19 of the casing and provided on its inner end with an annular flange 20 having a toothed rim 6. Intermediate between the nut 5 and the abutting cap 7 loosely mounted on the spindle 1, a coupling cone 9 is likewise mounted thereon so as to be free to move lengthwise, but prevented from rotation about the spindle, by a key 11 integral with the cone and adapted to slide in a longitudinal groove 10 of the spindle 1. Thus while the cone 9 is capable of lengthwise movements independently of the spindle, it cannot rotate except together with the latter or when the latter is operated in the one or the other direction. The spring 8 for the absorption of the counter-pressure abuts against the inner surface of the front cover 21 and, with its other end, against the abutting cap 7.

The female or counter-cone 12 engaging or co-operating with the male cone 9 is retained in its disengaged position, by the abutting cap 7 of the spring 8 with the aid of a conical friction surface 13 and pins 22 or the like engaging in an annular groove 14 of the cone 12. The latter has, at its rear end, a toothed rim 15 in mesh with a toothed or fluted shaft 16 duly supported in suitable bearings provided in the rear cover 19 and in a ring 18 rigidly connected with the latter by means of spacing bolts 17, so that the shaft 16 will be free to rotate about an axis parallel, to the axis of the spindle 1. The hereinbefore mentioned toothed rim 6 of the flange 20 of the nut 5 also meshes constantly with the toothed or fluted shaft 16.

The operation is as follows:

The extension 23 of the cover 21 forming the front end of the tool, is inserted into the end of the tube to be expanded, whereupon the spindle 1 provided with the usual right-handed thread is turned in anticlockwise direction whereby the casing 2 will be caused to rotate and the rolls 3 in the cover extension 23 will be caused, by the action of the roller 4 moving simultaneously with the spindle in the direction towards the rear cover 19, to radially move towards the inner face of the tube under treatment so as to expand the same by a rolling action under pressure to ensure a tight fit in the header or boiler wall. As the degree of pressure required for a suitable expansion is reached and the rotary movement of the casing is reduced thereby, the nut 5 will be caused to advance and move into the casing and to force the male cone 9 into the female or counter-cone 12 mounted in the spring-controlled abutting cap 7. The expansion of the tube having thus been effected to ensure a tight fit, the female cone 12 will, upon the removal of ensuring strain due to the spindle 1 now rotating at a greater speed than the casing, disengage from the friction surface 13 of the cap 7 and act to drive the shaft 16 which in turn will act to return the nut, by way of rotation in anticlockwise direction, to its initial position so that then all of the parts will be in the position ready for a next operation.

It will be evident that my invention, whilst still being adhered to in its main essentials, may be varied and adapted in many ways, according to the requirements desired or most suitable under different circumstances.

What I claim is:—

1. A tool for expanding water tubes of the type set forth, comprising a casing, a nut mounted in said casing, a threaded spindle in said nut, a plurality of rolls, a roller integral with said spindle and adapted to co-operate with the said rolls for the expanding purpose, a coupling cone mounted on the said spindle so as to be movable lengthwise thereon, but incapable of revolving except together with the spindle, a counter-cone adapted to be engaged by said coupling cone, and means for automatically returning the rolls to inoperative position when the expanding work is done, without changing the direction of the rotary movement to be given to the said spindle.

2. A tool for expanding water tubes of the type set forth, comprising a casing, a nut mounted in said casing, a threaded spindle in said nut, a plurality of rolls, a roller integral with the said spindle and adapted to co-operate with the said rolls for the expanding purpose, a coupling cone mounted on the said spindle so as to be movable thereon in axial direction, but incapable of revolving except together with the spindle, a counter-cone adapted to co-operate with the said coupling cone, a cap on the said counter-cone, a counteracting spring on the spindle, abutting against the said cap, and means for automatically returning the rolls to inoperative position without changing the direction of the rotary movement to be given to the said spindle.

3. A tool for expanding water tubes of the type set forth, comprising a casing, a nut mounted in said casing, a threaded spindle in said nut, a plurality of rolls, a roller integral with the said spindle and adapted to move the said rolls in radial directions, a coupling cone mounted on the said spindle so as to be movable thereon in axial direction, but incapable of revolving except together with the spindle, a counter-cone adapted to co-operate with the said coupling cone, a cap on the said counter-cone, a counteracting spring on the spindle abutting against the said cap, a toothed rim on the said counter-cone, a toothed or fluted shaft suitably mounted in the said casing and meshing with the said toothed rim, a second toothed rim on the nut also in mesh with the said shaft, and a friction-cone projecting from the inner face of the said cap and adapted to co-operate with the counter-cone, substantially as and for the purpose set forth.

In testimony whereof I have affixed my signature.

RUDOLF MIHATSCH.